Patented Feb. 19, 1946

2,395,221

UNITED STATES PATENT OFFICE 2,395,221

PROCESS FOR PURIFYING METAL HALIDE SOLUTIONS

Clifford A. Hampel, Painesville, Ohio, and John E. Weller, Lake Charles, La., assignors to The Mathieson Alkali Works, Inc., New York, N. Y., a corporation of Virginia No Drawing. Application February 12, 1943, Serial No. 475,678

4 Claims. (Cl. 23—89)

Our invention relates to improvements in the purification of aqueous solutions of the halides of the alkali metals and the alkaline earth metals including magnesium with respect to ions of metals such as manganese and iron.

In a number of instances, extreme purity of such brines with respect to such heavy metal ions is of vital importance. For example, magnesium chloride fusions subjected to electrolysis for the production of magnesium metal must be substantially free from such impurities, and consequently the purity in this respect of magnesium chloride brines from which make-up magnesium chloride is produced is essential to satisfactory operation.

The conventional method for extreme purification of magnesium chloride brines with respect to manganous ions is to precipitate this impurity as manganese dioxide by oxidation with potassium permanganate. Potassium permanganate is expensive, and under present circumstances not readily available. Further, since the addition of any excess of potassium permanganate would defeat the purpose of the addition, this method involves exact analysis of the brine and critical control of the permanganate addition.

We have now discovered that this purification can be effected with sodium chlorite, $NaClO_2$.

When sodium chlorite is added to a magnesium chloride brine containing manganous ions, the brine having a pH of not less than 7, the manganese present is oxidized to manganese dioxide which precipitates and can be readily separated by filtration. Sodium chlorite is relatively inexpensive, it is available, and the simple addition of an excess to insure complete removal of manganese ions eliminates the need for exact analysis and critical control since the reaction merely adds sodium chloride to the brine and an excess of chlorite is not objectionable.

Similarly, the addition of sodium chlorite to a sodium chloride brine containing ferrous sulphate, the brine having a pH of not less than 7, will precipitate the iron as ferric hydroxide in readily filterable form.

Although our invention is not to be limited by reference to any theory of its operation, the following equations may typify, respectively, (a) such removal of manganese and (b) such removal of iron from such brines:

(a) 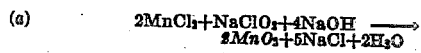

(b) 

The following examples illustrate applications of our invention:

Example I

An aqueous solution of 200 grams of technical sodium chlorite containing 83% $NaClO_2$ was added to 200 gallons of an aqueous magnesium chloride brine containing 30%–35% $MgCl_2$ (by weight) and 50–75 parts per million of manganese and saturated with respect to magnesium oxide. Manganese dioxide was precipitated and removed by filtration. The filtered brine contained less than 1 part per million of manganese.

Example II

A mixture of 1 part (by weight) of technical sodium chlorite and 2 parts of technical sodium hydroxide was added to an aqueous sodium chloride brine containing 125 parts NaCl and 5 parts of ferrous sulphate. Ferric hydroxide was precipitated and removed by filtration. The filtered brine was substantially free from iron.

The comparison of manganese contents in the first example above was made by the periodate colorimetric method.

The quantity of chlorite used should be at least equivalent to the quantity of heavy metal impurity to be removed. As noted, an excess does not impair the purification and the use, as an average, of an amount sufficient to insure the addition of that minimum amount required for the purification is one way to simplify and expedite the operation.

Elevated temperatures accelerate the reaction and precipitation of the heavy metal impurities. For example, at 25° C. complete precipitation of manganese from a magnesium chloride brine may require an hour whereas at 60° C. the precipitation may be substantially complete in a few minutes. Temperatures ranging upwards from about 40° C. to the boiling temperature of the brine are advantageous.

The chlorites have special advantages as applied to purification with respect to manganese. Several oxidizing agents will bring manganese to a state of higher valence but, whereas hypochlorites, for example, oxidize amphoteric manganese to soluble permanganates, chlorites oxidize manganese only to the insoluble quadrivalent state.

Our invention is generally useful in the purification of such brines with respect to metals of variable valence forming an insoluble oxide or hydroxide in a state of higher valence. We refer herein to such metals as "heavy metals."

The water soluble chlorites, particularly the chlorites of the alkali metals and the alkaline earth metals, are useful in the purification method of our invention. We refer herein to such chlorites as "chlorites."

The advantages of our invention include the relatively low cost and availability of the purification agents used, the simplicity and efficacy of the purification operation, and, with particular reference to manganese as an impurity, the inherent balance of the reactions involved.

We claim:

1. In the purification of aqueous solutions of the halides of the alkali metals and the alkaline earth metals including magnesium, said solutions containing heavy metal compounds as impurities, the improvement which comprises precipitating the heavy metal impurities from the solution while at a pH of not less than 7 by adding a chlorite of the group consisting of the alkali and alkaline earth metal chlorites.

2. In the purification of aqueous solutions of the halides of the alkali metals and the alkaline earth metals including magnesium, said solutions containing heavy metal compounds as impurities, the improvement which comprises precipitating the heavy metal impurities from the solution while at a pH of not less than 7 and at a temperature upwards of about 40° C. by adding a chlorite of the group consisting of the alkali and alkaline earth metal chlorites.

3. In the purification of aqueous solutions of the halides of the alkali metals and the alkaline earth metals including magnesium, said solutions containing a compound of manganese as an impurity, the improvement which comprises precipitating the manganese from the solution while at a pH of not less than 7 as manganese dioxide by adding a chlorite of the group consisting of the alkali and alkaline earth metal chlorites.

4. In the purification of aqueous solutions of the halides of the alkali metals and the alkaline earth metals including magnesium, said solutions containing heavy metal compounds as impurities, the improvement which comprises precipitating the heavy metal impurities from the solution while at a pH of not less than 7 by adding a chlorite in excess of the amount equivalent to the heavy metal impurities to be removed said chlorite being from the group consisting of the alkali and alkaline earth metal chlorites.

CLIFFORD A. HAMPEL.
JOHN E. WEILER.